Nov. 9, 1926.                                                               1,606,166
T. L. GREEN ET AL
BISCUIT MACHINE
Original Filed Dec. 23, 1919        3 Sheets-Sheet 1

Inventors.
Thomas L. Green
AND
William Presley Morton
Emery, Booth, Janney & Varney
Attys.

Nov. 9, 1926.  
T. L. GREEN ET AL  
BISCUIT MACHINE  
Original Filed Dec. 23, 1919  3 Sheets-Sheet 2  
1,606,166
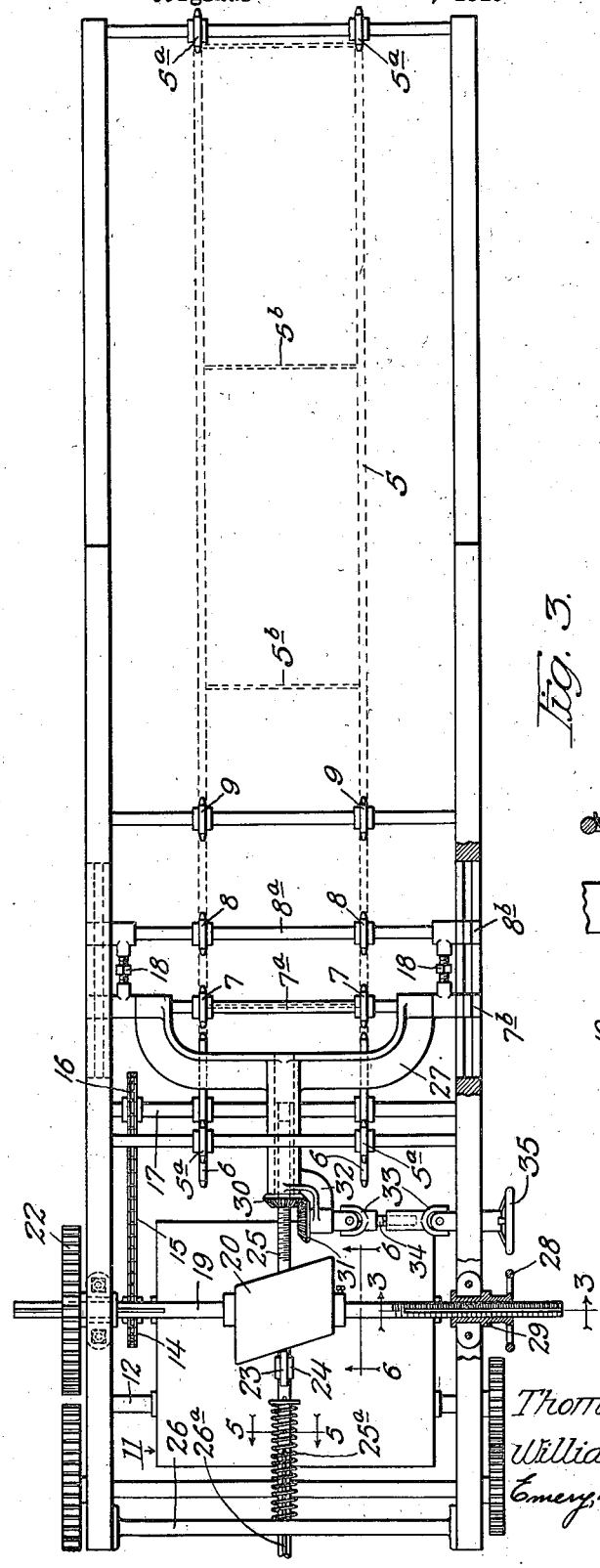
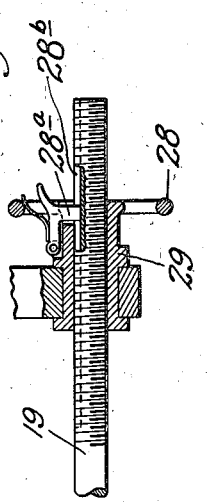
Inventors.
Thomas L. Green
AND
William Presley Morton.
Emery, Booth, Janney & Varney
Attys.

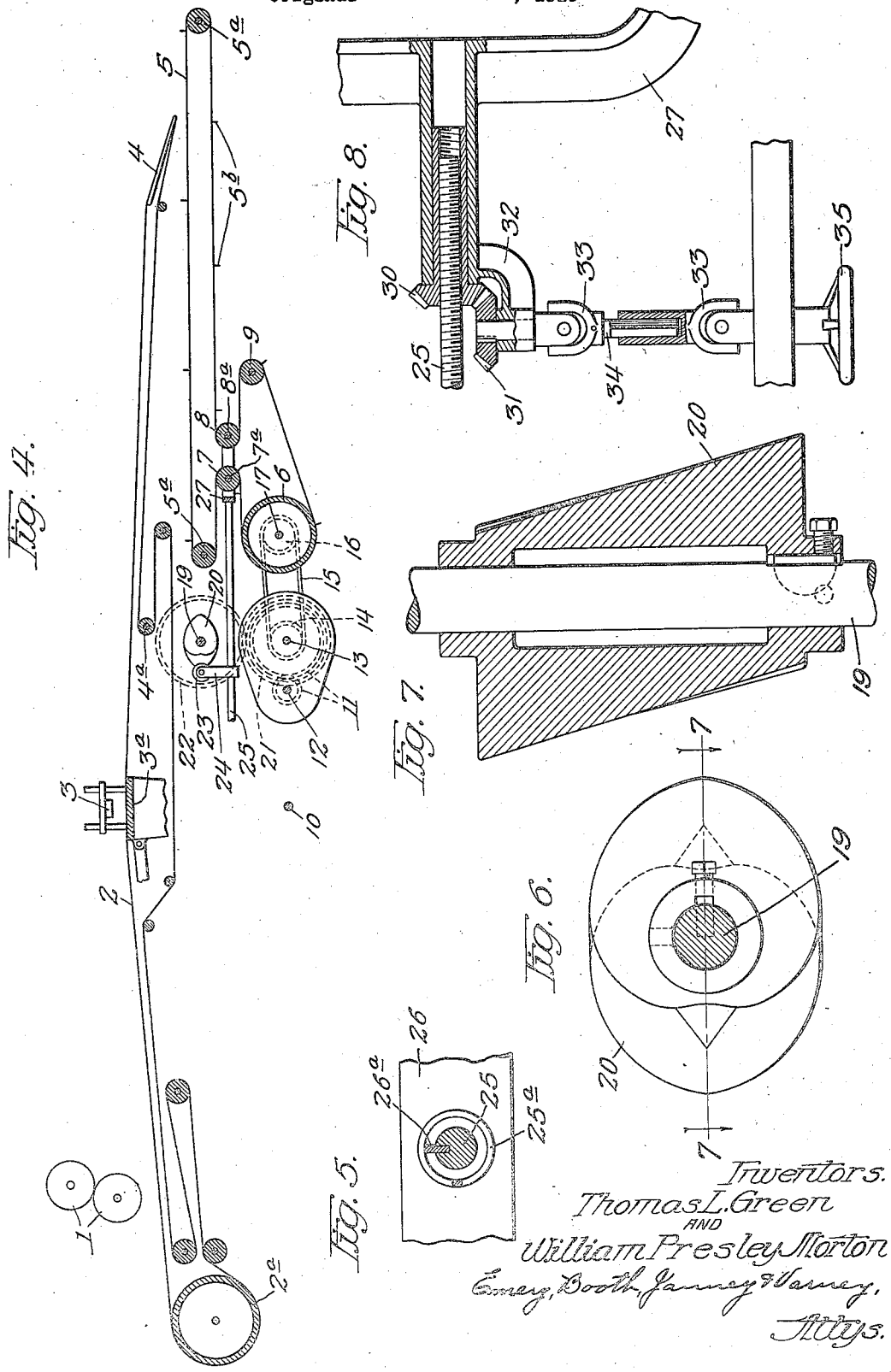

Patented Nov. 9, 1926.

1,606,166

UNITED STATES PATENT OFFICE.

THOMAS L. GREEN AND WILLIAM PRESLEY MORTON, OF INDIANAPOLIS, INDIANA; SAID MORTON ASSIGNOR TO SAID GREEN.

BISCUIT MACHINE.

Application filed December 23, 1919, Serial No. 346,981. Renewed October 19, 1925.

This invention relates to machines for use in making biscuits, lozenges and the like.

Among other objects, the invention is intended to provide improved means for controlling the positioning of the products on receiving means.

The character of the invention will be best understood by reference to one form of biscuit-cutting and panning machine containing an embodiment of the invention which is shown for illustration in the accompanying drawings.

In the drawings:

Fig. 2 is a plan view thereof, omitting all parts except the mechanism for operating the pan carrier, which latter is indicated by dotted lines.

Fig. 3 is a detail sectional view of the hand wheel for axially adjusting the pan-skip actuator.

Fig. 4 is a diagrammatic view of the illustrative machine.

Fig. 5 is a detail view of the guide for the rod connecting the pan-skip actuator with the carrier-adjusting devices, being a section on line 5—5 of Fig. 2.

Fig. 6 is an end elevation of the pan-skip actuating cam, looking from the line 6—6 of Fig. 2.

Fig. 7 is a longitudinal section of the latter on line 7—7 of Fig. 6.

Fig. 8 is a plan partly in section of the means for relatively adjusting the skip actuator and pan carrier while the machine is in operation.

Figure 1:
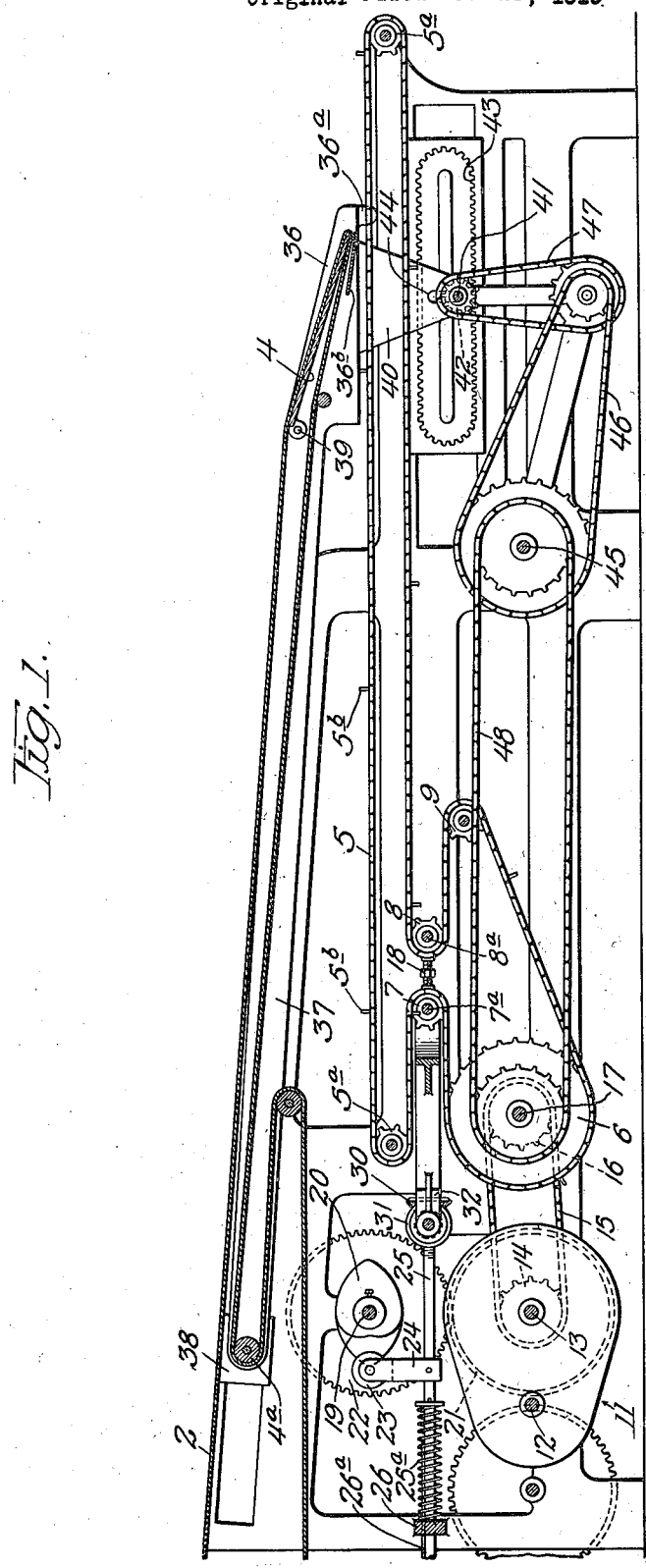
Fig. 1 is a longitudinal sectional view of the delivery end portion of the illustrative machine.

The illustrative machine is of the type described in patent to Green No. 1,292,311, January 21, 1919, in which biscuits are cut or died out from a continuously moving dough sheet and are deposited periodically on continuously moving pans by alternately retreating and advancing the delivery end of the dough apron, or of a separate delivery apron forming in effect a continuation of the dough apron, so as alternately to shorten and lengthen the supporting surface of the apron and thereby withdraw such surface from beneath the biscuits to drop them into the pans. With this arrangement, the pan skipping function, i. e. periodic acceleration or other regulation of the pan speed to enable the biscuit depositing to skip the edges of adjacent pans, is effected by movement of the pan carrier at alternating different speeds, one during the depositing of the biscuits and the other during the intermediate periods while the panner blade is advancing, such alternating speeds causing the pans to be successively presented so as to centralize the batches of biscuits on the pans, prevent depositing at the adjacent pan edges and insure equal or sufficient margins between the biscuits and ends of the pans.

Such machine is diagrammatically represented in Fig. 4 of the drawings, in which 1 indicates the dough-sheeting rollers; 2 the dough apron; 3 the biscuit cutter; 4 the panner blades; and 5 the pan carrier.

The dough apron, which conveys the sheet of dough from the rollers to the cutter, is driven from the continuously driven drum $2^a$, passes over the cutter bed $3^a$, and, in this instance, continues to and around the panner blade, thence returning around suitable guiding and tensioning rollers to the driving drum $2^a$.

Except that the dough apron is thus continuous as a delivery apron around the panner blade, and except in certain other features pertaining to the depositing and panning mechanism, as hereinafter described, the diagram in Fig. 4 is intended to represent a machine of substantially the same general organization, various functioning parts, accessories and operating mechanism described in said Patent No. 1,292,311; though it will be understood that the same exemplifies cooperating feeding, forming and receiving means of any machine for making biscuits or other articles to which the present invention or features thereof may be applicable.

As described in said patent, the biscuit cutter 3 reciprocates vertically, and, with its cutter bed $3^a$, is moved horizontally back and forth, moving forward in unison with the feed of the dough sheet while performing its cutting operation.

The biscuits, as they are cut, are fed continuously forward by the apron, the scrap being automatically removed by a suitable scrap carrier (not shown), and the biscuits are periodically discharged by the pan-full from the delivery end of the apron, which, as stated, is alternately shortened and extended for that purpose, each retreat causing a number of biscuits to drop successively upon the pan. The retreating and advancing movement of the panner blade are accompanied by like movements of a take-up roller 4ª, around which the lower run of the apron is looped, so as to take up and let out the apron as its upper surface is shortened and lengthened.

As explained in the Green patent aforesaid, if the panner blade is retreated and advanced at the same speed that the apron feeds forward, it is only necessary to retreat it a distance of one-half the length of the batch of biscuits to be deposited, or for a distance of approximately half a pan length; the combined effect of the continuous forward feeding of the apron, retreating of the panner blade and continuous pan feed being to deposit the successive rows of biscuits on the entire length of a pan, with the exception of desired margins at the ends of the pan.

The rate of movement of the pans, though moving at alternately different speeds, is such as to carry a pan past the foremost position of the delivery end of the apron during the retreat and advance of the panner blade and to present the next pan in proper position at the time of the succeeding retreat of the panner blade.

The pan carrier 5, in the form herein illustrated, comprises a pair of endless chains running around the carrier-shaft sprocket wheels or guides 5ª and provided at intervals corresponding to the pan lengths with pan-engaging lugs 5ᵇ. Said chains are continuously driven from driving sprocket wheels 6 and are guided between the latter and the carrier-shaft sprockets by suitably arranged tensioning and guiding sprocket wheels 7, 8 and 9.

Obviously either of the carrier chains may typify a driven chain or its equivalent of a carrier or pan feeding device in which the pans are carried otherwise than by the chain or chains itself.

As in the former Green patent machine, the pan carrier derives its motion from the cutter-operating crank shaft 10 (Fig. 4) through a set of speed-change gears 11, whereby the carrier may be adjusted to any predetermined speed for the product to be produced, or, in other words, adjusted to suit the speed of the dough apron and frequency of operation of the cutter. The driving train from the cutter-operating shaft 10 to the shaft 12 of the speed-change gears, partially shown in Figs. 1 and 2, is the same as in said Patent No. 1,292,311.

From the shaft 13 of the speed-change gears, motion is communicated to the carrier-driving sprockets 6 by the sprocket wheel 14 and sprocket chain 15 engaging sprocket wheel 16 on shaft 17 of the carrier driving sprockets 6. The sprockets referred to are fast on their respective shafts. Thus, in the illustrative machine, the transmission or driving train from the cutter-operating mechanism to the pan carrier is positively geared with the latter and will always drive the carrier driving sprocket wheel 6 at a constant speed, such speed being determined by proper selection of the speed-change gears 11.

To accomplish the pan-skipping and adjusting functions, notwithstanding such positive drive of the pan-carrier chains from the continuously uniformly driven sprockets 6, provision is made for adjusting the endless carrier chains while in motion to cause relative movement between the pan-feeding and operatively-connected runs of the chains, thus accelerating or retarding the pan speed while the adjustment is taking place. In the illustrative machine, the adjusting means for this purpose comprises the guiding and tensioning sprockets 7 and 8, around which opposite portions of the chains are looped, the said sprockets being shiftable for letting out and simultaneously drawing in the chains at opposite sides of the carrier driving sprocket 6, with the consequent effect of relatively moving the upper run of the chain. Thus if the sprockets 7 and 8 are shifted in one direction the movement of the pans will be accelerated, and if shifted in the opposite direction the movement will be retarded.

The shafts 7ª and 8ª of said carrier-adjusting sprockets are journaled in bearings 7ᵇ and 8ᵇ slidable in guide openings in the side frames of the machine; and the shafts carry loose collars connected by turn-buckles 18, whereby the shafts with the respective sprocket wheels 7 and 8 are coupled for movement in unison. By means of the turn-buckles the shafts may be properly aligned and adjusted to maintain proper tension upon the carrier chains.

For automatically periodically operating these chain-adjusting sprockets to produce an intermittent pan skip, or alternate changes of pan speed, the coupled sprocket shafts 7ª and 8ª are connected with a pan-skip actuator, herein typified by a cam 20 on shaft 19 which is driven from the shaft 13 of the speed-change gears 11 by the intermeshing gears 21 and 22, the said cam or pan-skip actuator being thus properly synchronized with the driving train of the pan carrier.

In the construction shown, the cam 20 cooperates with a follower roller 23 mounted in a bracket 24 secured to a rod 25, one end of which is slidable in a guide in a cross-member 26 of the machine frame while the other end is attached as hereinafter described to a yoke 27. The rod 25 may be held from turning by means of a spline or feather key 26ª in its guide 26 as shown in Fig. 5. A spring 25ª may be arranged between the guide 26 and a collar on the rod 25 to maintain the follower roller in place against the cam, though the spring is not essential as the pull of the pan carrier chains will maintain the follower against the cam.

The yoke 27 is provided with bearings for the shaft 7$^a$, which shaft is further mounted in the sliding bearings 7$^b$ in the machine side frames. Thus the yoke 27, as it is reciprocated by the cam, will move the coupled shafts 7$^a$ and 7$^b$ with the sprockets 7 and 8 back and forth.

In view of the periodic depositing of the biscuits from a continuously moving apron upon continuously moving pans, by the intermittent retreat or withdrawal of the upper surface of the apron at its delivery end, the skipping effect is accomplished by feeding the pans at alternating different speeds, one during the discharge and the other during the intervening periods, as explained in said Patent No. 1,292,311. For this purpose the cam 20 may be of the type described in said patent, i. e. a heart-shaped cam the cross-sectional contour of which comprises two opposite spirals of Archimedes, which in co-acting with the follower will shift the coupled carrier-adjusting shafts and sprockets at a uniform rate. The carrier being continuously driven and the action of the cam being gradual, the transition from one pan speed to the other will be consequently gradual as is desirable in this character of biscuit depositing mechanism.

The cam 20 is of varying radius lengthwise of its shaft, giving it a general oblique form, and is axially adjustable relative to the follower 23 for varying the cam throw and extent and rate of movement of the carrier adjusting sprockets 7 and 8, as may be required, dependent upon such conditions as the size of products and desired number of rows and the disposition of the same on the pans, etc. The central portion of the cam is concentric with the shaft, and when the follower roller 23 is engaging this central portion there will be no reciprocation of the sprockets 7 and 8, hence the pan carrier will then move continuously at uniform speed. But when the cam is moved endwise from its neutral position, it will oscillate the follower and thus impart a reciprocation to said sprockets 7 and 8, the movement in one direction causing an acceleration of the pan speed and the movement in the opposite direction retarding the speed. Thus according to requirements, the cam may be adjusted to cause depositing of successive rows of products indefinitely at uniform spaces apart on receiving surfaces, or to cause periodic spacing between batches.

For axially adjusting the cam, the shaft 19 on which the cam is rigidly mounted is adapted to be moved endwise by turning the hand wheel 28. Said hand wheel has a long hub 29 formed with a collar at each end and mounted in a bearing in one of the main side frames. The shaft 19 is screw-threaded through the hand wheel so as to be shifted endwise when the hand wheel is turned independently on said shaft. Normally, however, the shaft and hand wheel turn together, the hand wheel being latched non-rotatably to the shaft by the latch 28$^a$ engaging a slot 28$^b$ in the shaft. Said latch may be released when the hand wheel is to be turned for adjusting the shaft.

The gear 22 at the opposite end of the shaft 19 has a hub similar to that of the hand wheel 28, and likewise mounted in a bearing in the opposite side frame, so as to prevent lateral movement of said gear 22; and the shaft 19 is slidable in said gear by a long spline or feather key so as to permit its endwise movement through the gear.

As shown in Figs. 6 and 7, the two heart-shaped portions of the cam at opposite sides of its concentric middle portion are alike in shape but reversed in position. This construction renders it possible, in connection with an alternately advancing and retreating panner blade, either to accelerate the pan carrier while depositing the biscuits upon the pan or, if desired, to retard the movement of the pan carrier relatively during such delivery and accelerate it while the panner blade is advancing.

In some cases it is desirable to place the biscuits on the pans at greater spaces apart than the spaces at which they are cut on the dough apron. For instance, in cutting dough bars (composed of superposed strips of dough) into sections by a straight knife cutter, it is necessary that these sections or cakes be separated upon the pan a substantial distance apart to prevent them from running together by the natural spread of the dough in the process of baking. Such increase of spacing may be accomplished by relatively speeding the pan during the depositing. Assume, for example, that dough bars are cut into sections of two inches, and that it is desired to deposit twelve rows of such sections on a pan say of thirty-seven inches length. The combined length of the twelve sections will be twenty-four inches. The dough apron will move forward in unison with the panner blade twelve inches, and will move forward another twelve inches during the retreat of the panner blade. During this latter period, the speed of the pan, if of the length stated, must be very materially accelerated so as to provide a suitable space between the cut portions of the dough bars.

On the other hand, it may be desirable to decrease the spacing of the biscuits on the pans as compared with the spacing at which they are cut. For instance, in operating upon dough for short cake products, it is often desirable to speed the dough apron relative to the frequency of operation of the cutter, so as to leave intervening portions of the scrap of such size and strength as to avoid breakage and preserve the integrity of the scrap sheet while being automatically removed by the scrap carrier. It therefore becomes desirable to reduce this spacing when the goods are placed upon the pan so as to effect economy in placing more goods upon a given surface. Thus goods occupying say forty-two inches on the apron may have to be placed upon a pan of thirty-seven inches length. Accordingly, the pan speed should be relatively reduced during the depositing of the biscuits.

Under the condition first stated, in which twenty-four inches of products are to be spread on a thirty-seven inch pan, the pan speed will be accelerated during the depositing of the biscuits and relatively retarded during the intervening periods while the panner blade is advancing, though at all times moving faster than the apron. Under the second stated condition, where batches of products occupying forty-two inches on the apron are to be placed on the same length pans, the pans will move at a slower rate than the apron during the depositing of the biscuits and at a considerably accelerated rate during the intervening periods. Again, under ordinary conditions, where the biscuits are to be placed on the pans at the same spacing at which they are cut, the pans will move at the same speed as the dough apron during the depositing and at a slightly accelerated speed while the panner blade is advancing. The desired conditions are established by adjusting the pan speed through the speed change gears 11, and by adjusting the cam 20 axially to produce the desired alternating pan speeds and have the acceleration occur at the period required. Whatever the conditions may be, assuming the position of the pans on the carrier to be in proper registry with the cam action, the pans will be successively presented to receive the first and subsequent biscuits in proper positions, producing the desired pan skip or the equivalent effect.

For relatively adjusting the skip actuator and pan carrier to register the pans with the pan skip, or for the equivalent function in the illustrative machine of setting the pan carrier relatively forward or back so as to insure in correlation with the cam action proper presentation of the pans to centralize the batches of biscuits thereon, the connection between the cam follower 23 and yoke 27 is rendered adjustable, such adjustment being accomplished in this instance by independently shifting the sprockets 7 and 8 during the motion of the carrier to effect the desired relationship of the pan carrier lugs to the delivery end of the apron in correlation with the action of the cam. For this purpose the rod 25 carrying the cam follower is screw-threaded through a bevel gear 30 in mesh with a bevel gear 31 which is journalled in a bracket arm 32 of the yoke 27. The bevel gear 31 is flexibly connected through the two universal couplings 33 and compensating sliding shaft 34 with a hand wheel 35 mounted in one of the main side frames as shown more clearly in Fig. 7. By means of said hand wheel 35 the bevel gears may be operated during the running of the machine either to shorten or lengthen the distance between the cam follower 23 and yoke 27, such adjustment moving the yoke and consequently the sprockets 7 and 8 and effecting a momentary acceleration or retardation of the pan feeding run of the pan carrier such as may be required to adjust the latter to proper relationship with the periodicity of the skip action.

By the aforesaid construction, the same results are obtainable as to gradually alternating the panning speeds and relatively adjusting the pan carrier, though positively connected with a continuously driven constant speed driving train, as are obtainable in said Patent No. 1,292,311 by the pan skipping differential interposed in the driving train and its associated adjusting means.

The mechanism for alternately advancing and retreating the delivery end of the dough apron may be of the type described in patent to Green No. 1,291,844 dated January 21, 1919, an important feature of which is provision for varying the extent of retreat of the panner blade in accordance with the size and number of rows of biscuits to be deposited on a pan. Such mechanism is partially represented in Fig. 1 of the drawings, applied however to a panner blade carrying frame which reciprocates horizontally without the up-and-down and tilting motions described in said Patent No. 1,291,844. In this case the panner blade frame 36 is connected by the side bars 37 with the shaft of the take-up roller 4$^a$, journalled in the sliding bearing blocks 38, and said frame 36 is provided at its forward end with rounded bearing shoes 36$^a$ sliding on the main side frames, whereby the panner blade frame is supported for horizontal reciprocation. The panner blade is hinged at 39 so as to swing downward. Thus as the panner blade retreats it will drag over the pans and deposit the biscuits, and as it advances it will move with the pans. The pan-engaging lugs 5$^b$ on the carrier chains may be in the form of cross-bars connecting the two chains so as to avoid injuring the dough apron as the lugs pass under and lift the end of the panner blade. Preferably a resilient sheet metal guard 36$^b$ is arranged in the frame under the panner blade to protect the apron.

Referring to the operating mechanism, the panner blade frame 36 carries depending brackets 40 in which is mounted an operating shaft 41. Said shaft 41 carries pinions 42 engaging endless racks 43, whereby the operating shaft 41 is caused to travel in an orbit-like path and thereby reciprocate the panner blade as explained in said Patent No. 1,291,844, but in order to avoid raising and lowering the pannel blade at the limits of its reciprocation the brackets 40 are provided with vertical slots 44 to permit the shaft 41 to move up and down therein. Said operating shaft 41 is driven from a shaft 45 by chain and sprocket gearing 46, 47 arranged to provide a flexible elbow transmission, and shaft 45 is driven from the carrying driving shaft 17 by sprockets and chain 48. In connection with this mechanism, means is provided, not shown, for imparting reciprocatory movement to the racks 43 to increase or decrease the reciprocatory movement of the panner blade, and also adjusting means for regulating the extent of movement of the racks, whereby the travel of the panner blade back and forth may be exactly adjusted to conform to the speed of the dough apron. For more specific description, reference is made to said Patent No. 1,291,844.

Obviously the present invention is not limited to any particular construction and arrangement, and the details of the illustrative machine may be variously modified. Furthermore it is not indispensable that all the features of the invention be used conjointly since they may be used to advantage in various combinations and subcombinations.

We claim—

1. A biscuit machine comprising, in combination, dough feeding means; biscuit forming means; a carrier for biscuit receiving means; means for synchronously operating the respective elements, including transmission means constantly geared with said carrier; and skip mechanism, located out of said transmission, comprising periodically actuated means for moving the receiving means relative to the geared portion of the carrier.

2. A biscuit machine comprising, in combination, dough feeding means; biscuit forming means; a carrier for biscuit receiving means; means for synchronously operating the respective elements, including transmission means constantly geared with said carrier; skip mechanism, located out of said transmission, comprising periodically actuated means for moving the receiving means relative to the geared portion of the carrier; and means manually operable during the running of the machine for adjusting said mechanism to register the receiving means with the skip.

3. A biscuit machine comprising, in combination, dough feeding means; biscuit cutting means; a continuously driven carrier having a receiving portion for biscuit receiving means and operative connections; said carrier adjustable while in motion to accelerate or retard its receiving portion without affecting its operative connections; and means for automatically periodically effecting such adjustment to produce a skip.

4. A biscuit machine comprising, in combination, dough feeding means; biscuit cutting means; a continuously driven carrier having a portion arranged for biscuit receiving means and operative connections; said carrier adjustable while in motion to accelerate or retard its receiving portion without affecting its operative connections; means for automatically periodically effecting such adjustment to produce a skip; and adjusting means operable during the running of the machine to vary the extent of the skip.

5. A biscuit machine comprising, in combination, dough feeding means; biscuit cutting means; a continuously driven carrier having a portion arranged for biscuit receiving means and operative connecting portions; said carrier adjustable while in motion to accelerate or retard its receiving portion without affecting its operative connections; and adjusting means operable during the running of the machine to register the receiving means with the skip.

6. A biscuit machine comprising, in combination, dough feeding means; biscuit forming means; a biscuit receiving carrier; means for operating the respective said elements synchronously; and automatic skip mechanism, comprising carrier-adjusting means for moving the receiving portion of the carrier relative to its operatively-connected portion, and periodic actuating means therefor.

7. A biscuit machine comprising, in combination, dough feeding means; biscuit forming means; a biscuit receiving carrier; means for operating the respective said elements synchronously; automatic skip mechanism, comprising carrier-adjusting means for moving the receiving portion of the carrier relative to its operatively-connected portion; and periodic actuating means therefor; and adjusting means for said mechanism operable while the machine is in motion.

8. A biscuit machine comprising, in combination, dough feeding means; biscuit forming means; a biscuit receiving carrier; operating means for the restrictive elements; carrier-adjusting means for moving its receiving portion relative to its operatively-connected portion; means for automatically periodically actuating said carrier-adjusting means to produce a skip; and means manually operable during the running of the machine for independently operating said carrier-adjusting means.

9. A biscuit machine comprising, in combination, biscuit forming means; dough feeding means; a biscuit receiving carrier; means for operating the respective elements including a transmission means geared with said carrier; and automatic skip mechanism located out of the transmission periodically cooperating with said carrier without affecting said transmission or its operative action with the carrier.

10. A biscuit machine comprising, in combination, biscuit forming means; dough feeding means; a continuously moving biscuit-receiving carrier; constant speed driving means positively geared with said carrier; and automatic means for periodically effecting a differential movement of the biscuit receiving portion of the carrier relative to its operatively connected portion.

11. A biscuit machine comprising, in combination, biscuit forming means; dough feeding means; a biscuit receiving carrier; operating means for the respective elements, including transmission means geared with said carrier; automatic skip means located out of said transmission; and means manually operable during the running of the machine for varying the extent of action of said skip means.

12. A biscuit machine comprising, in combination, biscuit forming means; dough feeding means; a biscuit receiving carrier; operating means for the respective elements, including transmission means geared with said carrier; automatic skip means located out of said transmission; and means manually operable during the running of the machine for setting the carrier relatively forward or back to register the skip with desired batch locations on the carrier.

13. A biscuit machine comprising, in combination, biscuit forming means; dough feeding means; a biscuit receiving carrier; operating means for the respective elements, including transmission means geared with said carrier; automatic skip means located out of said transmission; adjusting means to vary the extent of action of the skip means; adjusting means to register the skip with desired batch locations on the carrier; both said adjusting means having manually operating devices and constructed and arranged to permit adjustment during the running of the machine.

14. A biscuit machine comprising, in combination, biscuit forming means; dough feeding means; a carrier for biscuit receiving means; means for operating the respective elements synchronously; carrier-engaging devices shiftable to accelerate and retard the movement of the biscuit receiving means; and automatic means for shifting said devices back and forth.

15. A biscuit machine comprising, in combination, biscuit forming means; dough feeding means; a carrier for biscuit receiving means; means for operating the respective element synchronously; carrier-engaging devices shiftable to accelerate and retard the movement of the biscuit receiving means; skip actuating means; and means manually operable during the motion of the machine for shifting said devices to register the biscuit receiving means with the skip.

16. A biscuit-machine comprising, in combination, biscuit-forming means; dough feeding means cooperating therewith; a carrier for successively presenting biscuit-receiving pans; means for operating said elements synchronously; pan carrier guides movable back and forth to accelerate and retard the pan speed; and means for automatically periodically operating said guides to produce a pan skip.

17. A biscuit-machine comprising, in combination, biscuit-forming means; dough feeding means cooperating therewith; a carrier for successively presenting biscuit-receiving pans; means for operating said elements synchronously; pan carrier guides movable back and forth to accelerate and retard the pan speed; and means for automatically periodically operating said guides to produce a pan skip; and means for independently moving said guides to register the pans with the pan skip.

18. A biscuit-machine comprising, in combination, biscuit-forming means; dough feeding means cooperating therewith; a carrier for successively presenting biscuit-receiving pans; means for operating said elements synchronously; pan carrier guides movable back and forth to accelerate and retard the pan speed; and means for automatically periodically operating said guides to produce a pan skip; and manually-controlled means operable during the running of the machine for relatively adjusting said last named means and guides.

19. A biscuit machine comprising, in combination, biscuit-forming means; dough-feeding means; a continuously driven carrier for successively presenting biscuit-receiving pans; pan-skipping means cooperating with said pan carrier; means for operating the elements aforesaid at their appropriate times in the cycle of the machine; and means manually-operable during the running of the machine for setting the pan carrier relatively forward or back without affecting its driving connections.

20. A biscuit machine comprising, in combination, dough-feeding means; biscuit-forming means; a pan carrier; pan-skipping means located out of the carrier transmission; and means manually-operable during the running of the machine for effecting relative adjustment between the pan-skip and carrier without affecting said transmission or its operative connection with the carrier.

21. The combination of a continuously driven pan carrier; its driving means; pan-skipping means cooperating with the carrier; and means manually operable during the motion of the machine for adjusting the carrier to register the pans with the skip without affecting said driving means or its operative connection with the pan carrier.

22. The combination of a pan carrier; carrier-adjusting means for moving its pan carrying portion relative to its operatively connected portion; cooperating means to produce a skip; and means for operating said carrier adjusting means to register the pans with the skip.

23. The combination of a pan carrier; carrier-adjusting means for moving its pan carrying portion relative to its operatively connected portion; and an automatic actuator periodically operating said carrier-adjusting means to produce a pan skip.

24. The combination of a pan carrier; carrier-adjusting means for moving its pan carrying portion relative to its operatively connected portion; means for automatically periodically operating said carrier-adjusting means to produce a pan skip; and adjusting means for varying the extent of carrier adjustment to control the extent of the skip.

25. The combination of a pan carrier; driving means therefor; the carrier-adjusting devices 7 and 8; and means for actuating the latter to produce a pan skip.

26. A machine of the class described comprising, in combination, dough feeding means; biscuit forming means; feeding means for biscuit receiving pans including an endless chain; means for operating the respective elements synchronously; including a driving gear engaged by the chain; and automatic skip mechanism comprising periodically actuated means for adjusting the chain to move its pan-feeding relative to its operatively-connected portion.

27. A machine of the class described comprising, in combination, dough feeding means; biscuit forming means; feeding means for biscuit receiving pans including an endless chain; means for operating the respective elements synchronously; including a driving gear engaged by the chain; automatic skip mechanism comprising periodically actuated means for adjusting the chain to move its pan-feeding relative to its operatively-connected portion; and means manually operable during the running of the machine for adjusting said mechanism to register the pans with the skip.

28. In a machine of the class described organized to deposit biscuits in successively presented pans, the combination of pan feeding means including a continuously driven endless chain; means controlling the arrangement of said chain adjustable during its motion for accelerating and retarding its pan-feeding run; and means for automatically periodically operating said last named means back and forth to produce a pan skip.

29. In a machine of the class described organized to deposit biscuits in successively presented pans, the combination of pan feeding means including a continuously driven endless chain; means controlling the arrangement of said chain adjustable during its motion for accelerating and retarding its pan-feeding run; means for automatically periodically operating said last named means back and forth to produce a pan skip; and means manually operable during the running of the machine for independently adjusting said chain controlling means.

30. In a machine of the class described organized to deposit biscuits in successively presented pans, the combination of pan feeding means including a continuously driven endless chain; means controlling the arrangement of said chain adjustable during its motion for accelerating and retarding its pan-feeding run; means for automatically periodically operating said last named means back and forth to produce a pan skip; a pan-skip actuator; and means for adjusting said chain controlling means during the operation of the machine to register the pans with the skip.

31. In a machine of the class described, pan feeding means comprising an endless chain having pan-feeding and operatively connected runs; driving means geared with said chain; chain-adjusting means to effect relative movement between its pan-feeding and operatively-connected runs; and automatic skip means operating through said chain-adjusting means to produce a periodic pan skip.

32. In a machine of the class described, pan feeding means comprising an endless chain having pan-feeding and operatively connected runs; driving means geared with said chain; chain-adjusting means to effect relative movement between its pan-feeding and operatively-connected runs; a pan-skip actuator; and means for operating said chain adjusting means during the motion of the machine to register the pans with the pan skip.

33. In a machine of the class described, pan feeding means comprising an endless chain having pan-feeding and operatively connected runs; driving means geared with said chain; chain-adjusting means to effect relative movement between its pan-feeding and operatively-connected runs; a pan skip actuator connected with said chain-adjusting means; and means for adjusting said actuator to vary the extent of operation of said chain-adjusting means.

34. In a machine of the class described, panning mechanism comprising, in combination, pan-feeding means including an endless chain; chain-driving means geared therewith; and pan-skipping mechanism comprising an actuator and means controlled thereby for simultaneously letting out and drawing in portions of the chain at opposite sides of its connection with the chain driving means.

35. In a machine of the class described, panning mechanism comprising, in combination, pan-feeding means including an endless chain; chain driving means geared therewith; and pan-skipping mechanism comprising an actuator and means controlled thereby for simultaneously letting out and drawing in portions of the chain at opposite sides of its pan feeding portion.

36. In a machine of the class described, panning mechanism comprising, in combination, an endless pan feeding chain; chain driving means; shiftable devices for simultaneously lifting out and elsewhere taking up portions of the chain to vary the movement of its pan-feeding run; automatic means for operating said devices to produce a pan skip; and means for independently operating said devices to adjust the position of the pans.

37. In a machine of the class described, panning mechanism comprising, in combination, an endless pan feeding chain; chain driving means; shiftable devices for simultaneously letting out and elsewhere taking up portions of the chain to vary the movement of its pan-feeding run; a pan skip actuator; and means manually operable during the motion of the machine for operating said shiftable devices to register the pans with the pan skip.

38. In panning mechanism, the combination of an endless pan-feeding chain; chain driving means; oppositely effective chain bends and guides interposed between the chain driving means and the pan-feeding portion of the chain; said guides concurrently movable to shorten one bend while lengthening the other for the purpose described.

39. The combination of a pan carrier comprising an endless conveyer; driving means geared with the conveyer; and a plurality of conveyer guides arranged between the driving means and ends of the conveyer; certain of said guides being shiftable to move the upper run of the conveyer relative to the portion geared with said driving means.

40. In a machine of the class described, the combination of a pan carrier; carrier driving means; and adjustable means independent of said driving means to permit driving the pans at a uniform speed or at alternating different speeds.

41. In a machine of the class described, the combination of a pan carrier; means for continuously uniformly driving the carrier; and automatic adjusting means associated with the carrier to cause movement of the pans at alternating different speeds.

42. In a machine of the class described, the combination of a pan carrier; means for continuously uniformly driving the carrier; automatic adjusting means associated with the carrier to cause movement of the pans at alternating different speeds; and provision for varying the duration of said speeds while the machine is in operation.

43. In a machine of the class described, the combination of a biscuit delivering apron; a pan carrier having pan engaging lugs; means for continuously driving said pan carrier; and adjusting means associated with the carrier for varying the relation of said lugs with the delivery end of said apron without affecting said carrier driving means.

44. The combination of a pan carrier; carrier driving means; the pan skipping cam 20; and carrier chain adjusting means controlled thereby.

45. The combination of a pan carrier; carrier driving means; the pan skipping cam 20; and the herein described means for relatively adjusting said cam and carrier.

46. The combination of a pan carrier; a driving train geared therewith; a pan skip actuator cooperating with the carrier; and means for relatively adjusting said actuator and carrier without change in said driving train or its operative connection with the carrier.

47. The combination of a pan carrier; carrier driving mechanism; and pan skipping mechanism located out of the driving mechanism; said pan skipping mechanism comprising a cam tapered axially to provide a varying degree of eccentricity; a follower cooperating therewith, the follower and cam being relatively axially adjustable for varying the throw of the cam; and means connected with the said follower cooperating with the pan carrier to produce a skip.

48. The combination of a pan carrier; a pan skipping cam, said cam having a central concentric portion and reverse tapered eccentric portions; a follower cooperating with the cam, the cam and follower being relatively axially adjustable; and means connected with said follower for varying the carrier movement; whereby the carrier may be driven at alternately different speeds and the timing of said speeds reversed.

49. In a machine of the class described, the combination of a delivery apron; means to effect intermittent discharge of biscuits therefrom; a continuously moving pan carrier to receive the biscuits from the delivery apron; means for continuously driving the carrier; and automatic means independent of the driving means to change the speed of the pans in alteration with the discharging action.

50. In a machine of the class described, organized for intermittently discharging batches of biscuits into successively presented pans, the combination of the biscuit discharging means; continuously moving pan carrying means; carrier driving means; and means out of the driving train to effect movement of the pans at one speed while receiving the biscuits and at a different speed between the depositing intervals to bring the succeeding pan into place.

51. In a machine of the class described, organized for intermittently depositing biscuit in successively presented pans, the combination of the biscuit depositing means; continuously moving pan carrier means; and cooperating means to cause movement of the pans at a relatively fast rate during the deposit of the biscuits and at a reduced rate in the intervals between the deposits.

52. A biscuit machine comprising, in combination, a traveling dough apron; biscuit cutting means cooperating therewith; alternately advancing and retarding means to receive and deposit batches of biscuit; continuously moving means for feeding biscuit receiving pans; means for periodically effecting a relative movement between the pan-feeding and the operatively-connected portions of said continuously moving means to produce a pan skip; and operating means for the respective elements including driving connections for the continuously moving pan feeding means unaffected by the operation of the skip producing means.

53. A biscuit machine comprising, in combination, a traveling dough apron; biscuit cutting means cooperating therewith; alternately advancing and retarding means to receive and deposit batches of biscuit; continuously moving means for feeding biscuit receiving pans; and means for accelerating the pan movement during the depositing action.

54. A biscuit machine comprising, in combination, a traveling dough apron; biscuit cutting means cooperating therewith; alternately advancing and retarding means to receive and deposit batches of biscuit; continuously moving means for feeding biscuit receiving pans; and means for effecting a relative movement between the pan-feeding and the operatively-connected portions of said continuously moving means during the depositing action and a reverse movement in alternation therewith.

55. A biscuit machine comprising, in combination, a traveling dough apron; biscuit cutting means cooperating therewith; alternately advancing and retarding means to receive and deposit batches of biscuit; continuously moving means for feeding biscuit receiving pans; means for effecting a relative movement between the pan-feeding and the operatively-connected portions of said continuously moving means during the depositing action and a reverse movement in alternation therewith; and means for independently effecting a like relative movement for adjusting purposes.

56. A biscuit machine comprising, in combination, a traveling dough apron; biscuit cutting means cooperating therewith; alternately advancing and retreating means to receive and deposit successive batches of biscuits; continuously moving means for feeding biscuit receiving pans; automatic pan skipping means; and means manually operable during the running of the machine for relatively moving the pan-feeding and operatively-connected portions of the continuously moving pan feeding means to adjust the pans with the pan skip.

57. A biscuit machine comprising, in combination, dough feeding and biscuit-forming means; means for feeding biscuit receiving pans; automatic pan skipping means; and means manually operable during the running of the machines for relatively moving the pan feeding and operatively connected portions of the pan feeding means to adjust the pans with the pan skip.

58. A biscuit machine comprising, in combination, a traveling dough apron; biscuit cutting means; alternately advancing and retreating means to receive batches of biscuit and deposit them in pans; a continuously uniformly driven pan carrier; relatively shiftable means associated with the carrier; and automatic means for periodically operating said last named means to produce a pan skip.

59. A biscuit machine comprising, in combination, a traveling dough apron; biscuit cutting means; alternately advancing and retreating means to receive batches of biscuit and deposit them in pans; a continuously uniformly driven pan carrier; relatively shiftable means associated with the carrier; means for automatically periodically operating said shiftable means to produce a pan skip; and manual means for independently operating said shiftable means to register the pans with the pan skip.

60. A biscuit machine comprising, in combination, a traveling dough apron; biscuit cutting means; alternately advancing and retreating means to receive batches of biscuit and deposit them in pans; a continuously uniformly driven pan carrier; relatively shiftable means associated with the carrier; automatic pan skipping means; and means manually operable during the running of the machine for operating said shiftable devices to adjust the pans with the pan skip.

61. A biscuit machine comprising, in combination, a traveling dough apron; biscuit cutting means; intermittently operating biscuit discharging means; a continuously driven pan carrier; and mechanism including shiftable means associated with the carrier for varying the pan speed in the intervals between discharging action.

62. In a biscuit machine organized for periodically depositing biscuits, the combination of pan feeding means; cooperating means for moving the pans at different speeds alternating with the depositing and intermediate periods; and means included in said last named means whereby such alternating speeds may be varied and reversed in period.

63. A biscuit machine comprising, in combination, a traveling dough apron; biscuit-cutting means; intermittently operating biscuit discharging means; pan-feeding means; and cooperating means whereby the movement of the pans may be either accelerated or retarded during the discharging periods.

64. In a machine of the class described, the combination of a continuously-moving biscuit-delivering apron; a continuously uniformly driven biscuit-receiving carrier having a biscuit receiving portion; and means for producing movement in the carrier itself for varying the speed of its biscuit-receiving portion, said means operable while the carrier is in motion.

65. A biscuit-machine comprising, in combination, a continuously moving dough apron; its driving means; cooperating biscuit-cutting means; said dough apron continuous to the delivery end; and means for alternately retreating and advancing said delivery end and simultaneously taking up or letting out the under run of the apron to maintain it in constant co-operative relation with its driving means and the biscuit-cutting means.

66. In a machine of the class described, the combination of a biscuit delivering apron; a pan carrier; a reciprocating panner blade frame and a hinged panner blade guiding the delivery end of the apron.

67. In a machine of the class described, the combination of a biscuit delivering apron; a horizontal reciprocatory panner blade and take-up roll for alternately shortening and extending the delivery end of the apron; and actuating means therefor comprising a mangle rack and driving pinion, the pinion being carried by the panned blade frame and movable vertically relative thereto to prevent up-and-down movement of the panner blade.

68. In a biscuit machine the combination comprising biscuit depositing means; biscuit receiving means; mechanism for relatively moving the biscuit depositing and receiving means at alternating different speeds during a cycle of operation; and means for changing the phase of the speed alternations with respect to the cycle of operation.

69. In a biscuit machine the combination comprising biscuit depositing means; biscuit receiving means; mechanism for moving the biscuit receiving means relatively to the depositing means; cooperating means for moving the receiving means at alternating different speeds; and mechanism for changing the phase of the speed alternations.

70. A biscuit machine comprising, in combination, biscuit forming and discharging means; a carrier for successively presenting biscuit receiving means to receive biscuits; mechanism for effecting and synchronizing the deposit of biscuits on said biscuit receiving means; oscillating means for periodically accelerating the speed of said receiving means; and means for changing the phase of acceleration with respect to the cycle of operation.

71. A biscuit machine comprising, in combination, biscuit forming and discharging means; a carrier for successively presenting biscuit receiving means to receive biscuits; mechanism for effecting and synchronizing the deposit of biscuits on said biscuit receiving means; oscillating means for alternately accelerating and retarding the speed of said biscuit receiving means during a cycle of operations; and means for changing the phase of the speed alternations with respect to the cycle of operations.

72. A biscuit machine comprising, in combination, biscuit-forming means; dough feeding means cooperating therewith; a carrier for successively presenting biscuit-receiving pans; means for operating said elements synchronously; oscillating mechanism to accelerate and retard the pan speed; and means for changing the phase of the accelerations and retardations of speed with respect to the cycle of operation.

73. In a biscuit machine organized for periodically depositing biscuits, the combination of pan feeding means; cooperating means for moving the pans at different speeds alternating with the depositing and intermediate periods; and means included in said last named means whereby such alternating speeds may be reversed in period.

74. In a biscuit machine comprising in combination biscuit receiving means having a continuously driven carrier to advance said receiving means; means for changing the speed of the biscuit receiving means independently of the movement of said carrier; a reciprocating panner blade for depositing biscuits on said receiving means; and means for adjusting the reciprocation of said panner blade.

75. In a biscuit machine comprising in combination a continuously driven pan carrier chain; a reciprocating panner blade for depositing biscuits or the like on pans moved by said carrier; means for periodically adjusting the speed of said pans independently of the driven movement of said carrier chain; and means for adjusting the reciprocations of said panner blade.

76. In a biscuit machine the combination comprising a travelling dough apron, a reciprocating panner blade for periodically depositing biscuit and for periodically interrupting biscuit deposit, means for adjusting the forward travel of said panner blade to apron speed, a travelling carrier for receiving the periodically deposited batches of biscuit, means for periodically changing the carrier speed, said speed changing means being constructed and arranged to synchronize the carrier speed changes with the reciprocations of said panner blade.

77. In a biscuit machine the combination comprising a biscuit feeding apron, mechanism associated therewith for periodically delivering batches of biscuits and adjustable to apron speed for interrupting biscuit delivery, and a biscuit carrier for receiving biscuits from said delivery mechanism and having driving means therefor operable to adjust the speed of said carrier during the period of biscuit reception.

78. In a biscuit machine the combination comprising, biscuit feeding means, biscuit delivery means, mechanism for adjusting the delivery means relative to the speed of said feeding means, biscuit receiving means constructed and arranged to receive biscuit from said delivery means, mechanism for adjusting the speed of said receiving means relative to said feeding means, and means for co-ordinating the speed of said receiving means with the adjustment of said delivery means.

79. In a biscuit machine the combination comprising a travelling dough apron, biscuit delivery mechanism having means for moving the same at apron speed to interrupt biscuit delivery, means for adjusting said depositing mechanism to apron speed, a biscuit receiving carrier having driving means therefor and means whereby the speed of said carrier may be adjusted to the speed of the delivery mechanism.

80. In a biscuit machine the combination comprising a travelling dough apron, reciprocating biscuit depositing means designed periodically to interrupt biscuit deposit, means for adjusting the speed of said depositing means relative to apron speed, a biscuit receiving carrier having driving means therefor and means whereby the carrier speed is adjusted to the speed of the biscuit depositing means.

81. In a biscuit machine the combination comprising a travelling dough apron, a reciprocating panner blade associated with said apron for periodically delivering biscuit and designed periodically to interrupt biscuit delivery, means for adjusting said panner blade to apron speed, a biscuit receiving carrier having driving means therefor and means whereby the speed of the carrier during biscuit delivery is changed according to panner blade speed.

In testimony whereof, we have signed our names to this specification.

THOMAS L. GREEN.
WILLIAM PRESLEY MORTON.